United States Patent [19]
Breen et al.

[11] Patent Number: 4,599,719
[45] Date of Patent: Jul. 8, 1986

[54] FULL DUPLEX DATA SET WITH HALF-DUPLEX EMULATION

[75] Inventors: Robert N. Breen, Lanoka Harbor; Robert A. Day, II, Middletown; Victor B. Lawrence, Holmdel; Michael R. Zboray, East Brunswick, all of N.J.

[73] Assignee: AT&T Information Systems Inc., Holmdel, N.J.

[21] Appl. No.: 621,517

[22] Filed: Jun. 18, 1984

[51] Int. Cl.$^4$ .............................................. H04L 5/14
[52] U.S. Cl. ......................................... 370/24; 370/31
[58] Field of Search .............................. 370/24, 31, 32

[56] References Cited
U.S. PATENT DOCUMENTS

| | | | |
|---|---|---|---|
| 4,110,560 | 8/1978 | Leary et al. | 370/31 |
| 4,214,123 | 7/1980 | Dagnelie | 370/31 |
| 4,232,318 | 11/1980 | Becker et al. | 370/31 |

OTHER PUBLICATIONS

MultiTech Systems brochure, "The New MultiModem 224," Nov. 11, 1984.
F-Tec brochure, "4848 Modem", Oct. 11, 1984.
Concord Data Systems, Inc., "Installation and Operation Manual-224 Data Modem," Dec. 1982.

Primary Examiner—Douglas W. Olms
Assistant Examiner—Kenneth I. Rokoff
Attorney, Agent, or Firm—Ronald D. Slusky

[57] ABSTRACT

Half-duplex switched carrier operation is emulated in a full-duplex voiceband data transmission system by utilizing predetermined signal indications in each channel to signal the initiation and termination of user data in that channel and thus to control the Receive Line Signal lead extending to the terminals at respective ends of the transmission channel. The signal indication which signals the initiation of transmission is illustratively two scrambled spaces inserted into an idle-state sequence of continuous scrambled marks. The signal indication which signals the termination of transmission is illustratively a stream of 65 unscrambled marks.

2 Claims, 4 Drawing Figures

FULL DUPLEX DATA SET WITH HALF-DUPLEX EMULATION

BACKGROUND OF THE INVENTION

The present invention relates to half-duplex data transmission.

Conventional half-duplex data sets operate in a switched carrier mode. In accordance with this mode of operation, when a "near-end" data set detects carrier energy from the far-end data set, it maintains its own carrier off and, at the same time, raises a Received Line Signal (RSL) lead extending to the associated near-end terminal equipment. The raised RSL lead serves as an indication to the near-end terminal equipment that data originating from the far end is being received and that the near-end equipment should inhibit itself from attempting to transmit data to the far end.

Once the far-end terminal has completed its transmission session, the far end data set turns off its carrier. The near-end data set responds to the disappearance of carrier by dropping its RLS lead. The near-end terminal equipment, if it has data to send, can now request the opportunity to do so by raising its Request-to-Send (RTS) lead extending to the near-end data set. The latter, in response, turns on its carrier and, after a predetermined delay which is discussed below, raises its Clear-to-Send lead extending back to the near-end terminal equipment. The near-end equipment now begins passing its data to the near-end data set, which modulates it onto the now-on, near-end carrier. Upon detecting this carrier energy, the far-end data set raises its RSL lead, thereby inhibiting the far-end terminal equipment from raising its RTS lead, and so forth.

An important parameter in the operation of half-duplex data sets is the so-called turnaround time, or delay, this being the minimum time in which one data set can raise its CTS lead after the other has dropped its RTS lead. The principal components of the turnaround time are (a) the time required for a data set to detect the disappearance of carrier energy from the channel (and thereupon drop its RLS lead), and (b) the above-mentioned predetermined delay, whose duration is set to be equal to the time that will be required after that data set has turned on its own carrier for the other data set to detect the presence of carrier and to acquire carrier phase and sample timing. The turnaround time is typically not insubstantial—a duration of 155 ms being typical for two-wire data sets such as the AT&T 201C data set—and may have a substantial negative impact on data transmission throughput—particularly in applications in which the direction of data transmission changes frequently.

In contrast to half-duplex data sets, full duplex data sets typically do not have an associated turnaround time. This is because full-duplex data sets transmit and receive over separate transmission channels (which are either physically distinct or, for example, frequency-divided portions of a single physical channel). Each data set maintains its carrier on continuously, thereby obviating the need to wait for the other data set to detect carrier energy and acquire carrier phase and sample timing.

The use of full-duplex data sets is not always a practical solution to the avoidance of long turnaround delays, however, because much existing data processing/communications equipment is designed to work using a half-duplex protocol. That is, the equipment relies on receiving an RLS signal to tell it whether, on the one hand, it is free to raise its RTS lead to initiate a transmission, in which case it will ignore any incoming data, or whether, on the other hand, incoming data is being received, in which case the terminal will inhibit itself from raising its RTS lead.

SUMMARY OF THE INVENTION

Data sets embodying the principles of the present invention operate as full-duplex data sets, i.e., using separate channels and continuous carriers in each channel for transmission and reception, but utilize predetermined signal indications in the carrier signal of each channel to signal the initiation and termination of user data in that channel. The RLS lead is controlled by the data set in response to these signal indications, thereby emulating the switched carrier operation of more conventional half-duplex data sets.

The invention affords at least two major advantages. First of all, the turnaround time can be made substantially less than that required by existing half-duplex data sets. Moreover, the fact that the data set is always really operating in a full-duplex mode and is merely emulating half-duplex operation means that half-duplex capability can be incorporated into the design of a full-duplex data set—thereby providing the set with both capabilities—at relatively modest additional cost.

In an illustrative embodiment of the invention, each data set transmits scrambled marks when in the idle state, i.e., neither transmitting nor receiving data, and the signal indication by which, in accordance with the invention, a first data set communicates to the other the fact that the terminal equipment associated with the former has raised its RTS lead is at least one scrambled space—and illustratively two scrambled spaces—inserted into the stream of scrambled marks. Also in the illustrative embodiment, the signal indication by which, in accordance with the invention, the first data set communicates to the second data set the fact that its associated terminal equipment has lowered its RTS lead is a predetermined bit pattern that the associated terminal equipment is unlikely to transmit. Illustratively, this pattern is a stream of 65 unscrambled marks.

DETAILED DESCRIPTION

Figure 1:
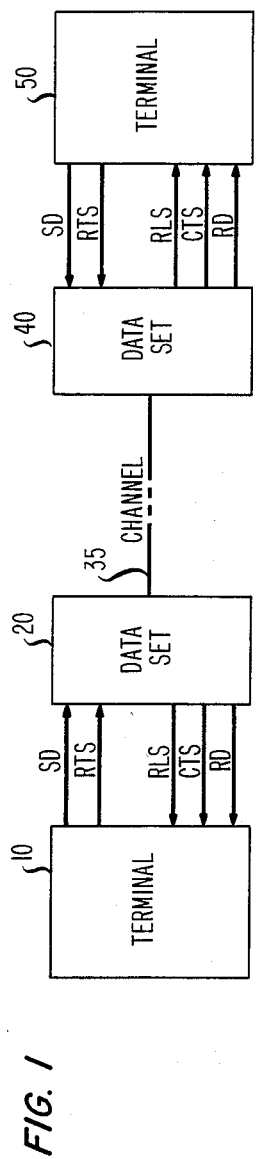
FIG. 1 is a block diagram of a half-duplex voiceband data transmission system in which the data sets of the system are, alternatively, prior art half-duplex data sets or full-duplex data sets which emulate the operation of half-duplex data sets in accordance with the invention.

In the system of FIG. 1, near-end terminal 10 communicates with far-end terminal 50 via near-end data set 20, communication channel 35 and far-end data set 40. Each one of terminals 10 and 50 may be, for example, a CRT display terminal, host computer, card reader or other piece of data processing/communication equipment. Terminal 10 (50) is connected to data set 20 (40) via a standard RS-232-C interface connector, particular ones of whose leads germane to the invention are explicitly shown in the drawing. Channel 35 is illustratively a switched network voiceband telephone channel.

Terminals 10 and 50 operate in a half-duplex mode, which means that only one of them transmits user data to the other at any given time, the term "user" data meaning data originating from a terminal as opposed to data originating from within a data set. Moreover, it will be assumed, in the first instance, that data sets 20 and 40 are a prior art type of half-duplex data set exemplified by the AT&T 201C data set.

Focusing attention on, for example, the near end terminal and data set, the state of the Received Line Signal (RLS) lead extending from data set 20 to terminal 10 indicates whether data is currently being received from the far end. Data sets such as the 201C operate in a switched carrier mode, meaning that the data set puts a carrier signal onto channel 35 only when data to be modulated onto that carrier signal is being applied to the data set from the associated terminal. The RLS lead of, for example, data set 20 is thus on—also said to be raised or activated—whenever carrier energy originating from data set 40 is present on channel 35. The data recovered by data set 20 from the received carrier signal is provided to terminal 10 on its Receive Data (RD) lead.

As long as the RLS lead remains on, terminal 10 inhibits itself from attempting to transmit data to terminal 50. However, once that lead is turned off—also said to be dropped or deactivated—terminal 10 may request to send data by turning on its Request to Send (RTS) lead. Data set 20 thereupon turns on its carrier and begins transmitting a start-up sequence to data set 40. As discussed more fully below, data set 20 raises its Clear to Send (CTS) lead after a delay of about 150 ms, referred to herein as the RTS/CTS delay. Terminal 10 is now free to pass near-end user data to data set 20 via its Send Data (SD) lead, that data is modulated by data set 20 onto the outgoing carrier and applied to channel 35. Data set 40, upon detecting carrier energy on channel 35, turns its RLS lead on and extends the received far-end user data to terminal 50 on its RD lead.

Once terminal 10 has completed its transmission, it turns its RTS lead off. Data set 20, in response, turns off its CTS lead and turns off its carrier signal. Data set 40 responds to the disappearance of carrier at the far end by turning its RLS lead off. At this point, either terminal can initiate a transmission by raising its RTS lead, and the above-described sequence is repeated.

The need for tha RTS/CTS delay arises out of a number of considerations. In particular, raising of the CTS lead must be delayed for a time sufficient to ensure that after data set 20 has turned on its carrier, data set 40 has enough time to detect same and to acquire carrier phase and sample timing.

Another reason for the RTS/CTS delay arises from the fact that any echo suppressors and/or cancellers in the channel are disabled in response to a tone generated by one of the data sets when the telephone connection was initially set up. This is necessary because the action of the echo cancellers would otherwise interfere with the data transmission. The 201C and similar data sets are designed to operate over switched network telephone lines using substantially the full bandwidth thereof for transmission in each direction. Thus with the echo cancellers disabled, an echo of a data set's transmission persisting on the channel after the data set has turned off its carrier might be interpreted by that data set, and passed to the associated terminal, as data from the other end of the channel. In order to preclude this, the data set clamps its RLS lead off for a period of time sufficient to ensure that the echo has died away. Assume, then, that data set 40 has just completed a transmission and that terminal 10 raises its RTS lead as soon as data set 20 drops its RLS lead in response to the disappearance of carrier on the channel. The RTS/CTS delay must be of sufficient duration to ensure that data set 40 has unclamped its RLS lead.

The total delay from the time that a terminal at, say, the near end of the channel drops its RTS lead and a data set at the far end of the channel raises its CTS lead—assuming that the far-end terminal raised its RTS lead as soon as its RLS lead was dropped—is referred to as the turnaround time and is given by the sum of a) the time it takes for a data set to detect that carrier energy has disappeared from the channel and b) the RTS/CTS delay. The carrier detect time of the 201C is about 5 ms and, as mentioned above, its RTS/CTS delay is about 150 ms. The turnaround time of the 201C is thus about 155 ms.

The turnaround time of half-duplex data sets has, of course, a negative impact on data transmission throughput—particularly in applications in which the direction of data transmission changes frequently. Full duplex data sets, by contrast, typically do not have an associated turnaround time. This is because full-duplex data sets transmit and receive over separate transmission channels (which are either physically distinct or, for example, frequency-divided portions of a single physical channel). Each data set maintains its carrier on continuously, thereby obviating the need to wait for the other data set to detect carrier energy and acquire carrier phase and sample timing. Moreover, since each data set transmits and receives over different channels, the presence of echos is not a concern.

The use of full-duplex data sets is not always a practical solution to the avoidance of long turnaround delays, however, because much existing data processing/communications equipment is designed to work using a half-duplex protocol. That is, the equipment relies on receiving an RLS signal to tell it whether, on the one hand, it is free to raise its RTS lead to initiate a transmission, in which case it will ignore any incoming data, or whether, on the other hand, incoming data is being received, in which case the terminal will inhibit itself from raising its RTS lead.

Data sets embodying the principles of the present invention operate as full-duplex data sets, i.e., using separate channels and continuous carriers in each channel for transmission and reception, but utilize predetermined signal indications in the carrier signal of channel to signal the initiation and termination of user data in that channel. The RLS lead is controlled by the data set in response to these signal indications, thereby emulating the switched carrier operation of more conventional half-duplex data sets such as the 201C.

The invention affords at least two major advantages. First of all, the turnaround time can be made substantially less than that required by existing half-duplex data sets. Moreover, the fact that the data set is always really operating in a full-duplex mode and is merely emulating half-duplex operation means that half-duplex capability can be incorporated into the design of a full-duplex data set—thereby providing the set with both capabilities—at relatively modest additional cost.

Figure 2:
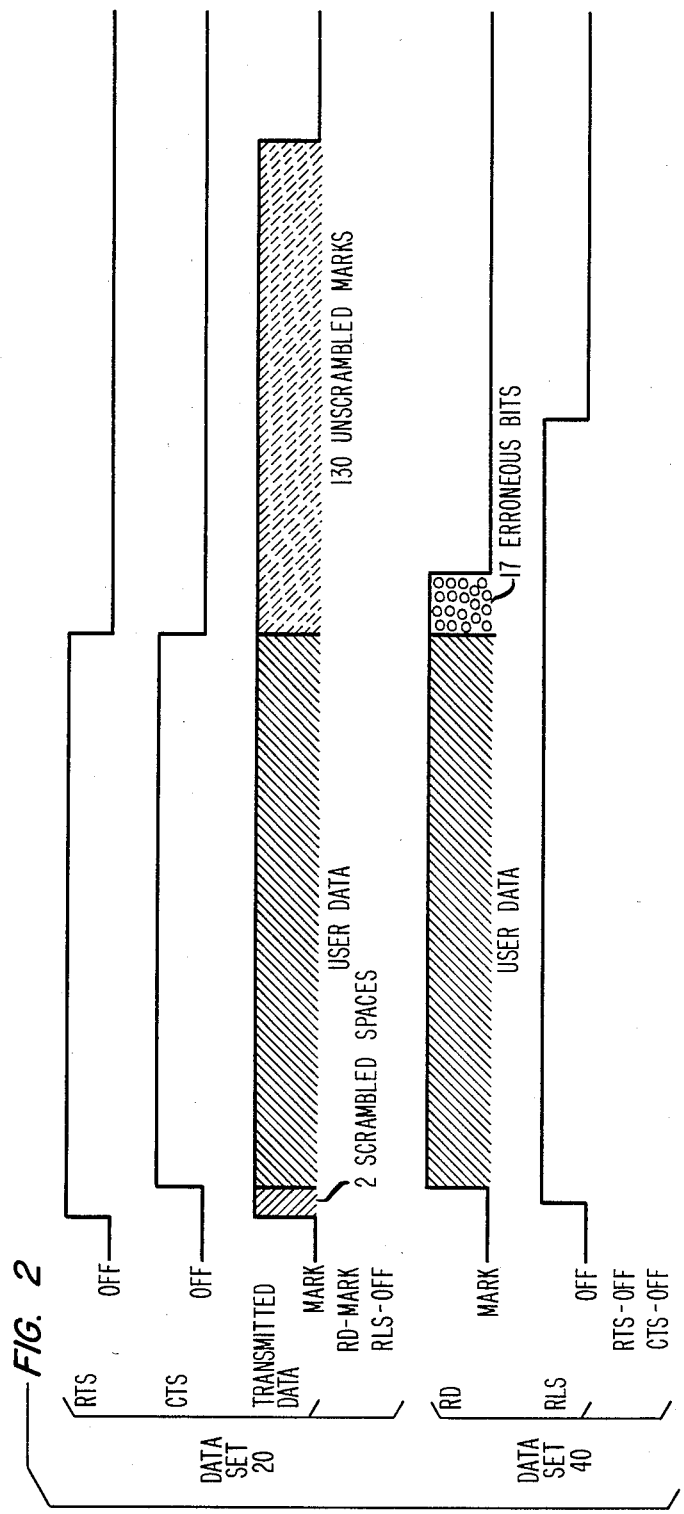
FIG. 2 shows signal waveforms used in the data sets of FIG. 1.

Attention is directed at this point to timing waveforms of FIG. 2 which will be described with reference to the state diagram of FIG. 3. Inasmuch as the invention is directed to an emulation of half-duplex data set operation, the drawing of FIG. 1 is as applicable to systems which include data sets embodying the invention as to systems using true half-duplex data sets, as assumed in the initial discussion hereinabove. The drawing of FIG. 1 thus can, and will, continue to be referred to as the description of the illustrative embodiment continues, with data sets 20 and 40 now being regarded as full-duplex data sets embodying the principles of the invention, each using a respective half of the bandwidth of channel 35 for transmission. In addition, the discussion will be primarily focused on transmission of data from terminal 10 to terminal 50, it being, of course, understood that transmission in the other direction would embody a similar sequence of events.

Figure 3:
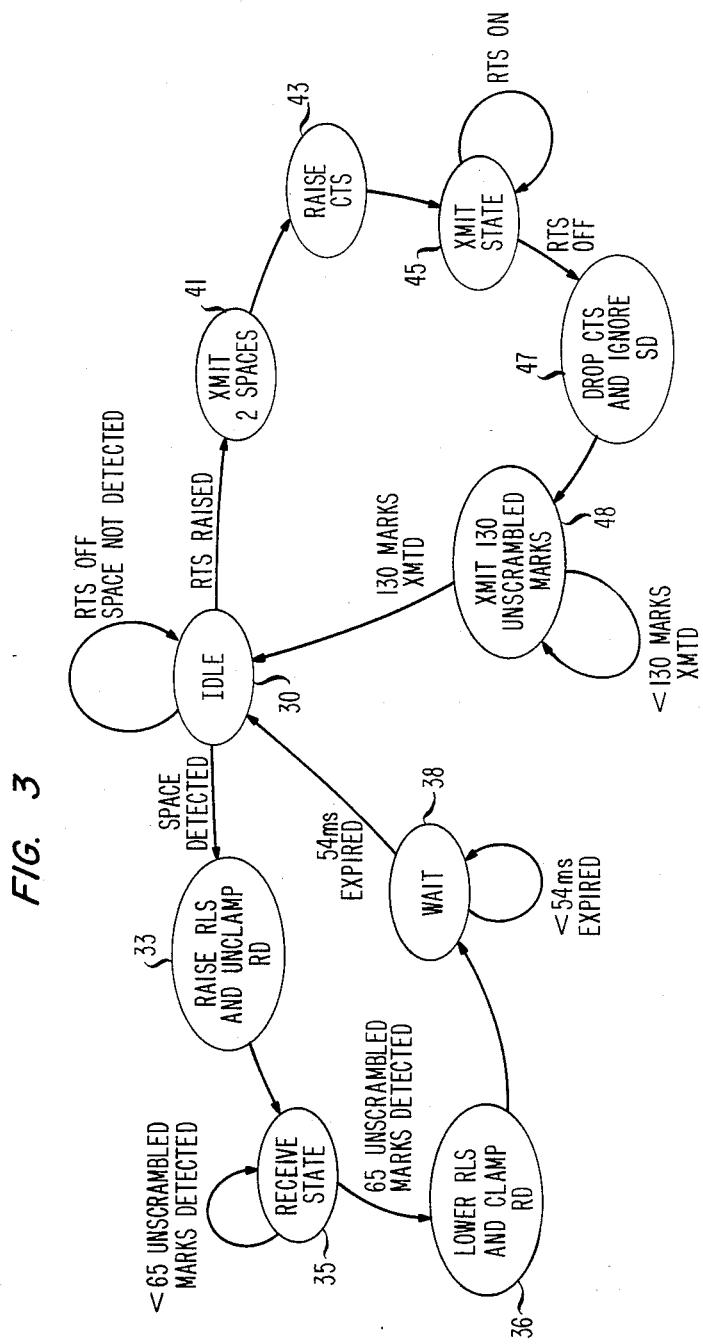
FIG. 3 is a state diagram of the operation of the data sets of FIG. 1.

Initially, each data set is in an idle state—denoted as state 30 in FIG. 3—meaning that neither data set is transmitting user data to, or receiving user data from, the other. In this state, the RTS, CTS AND RLS leads of both data sets are all off. Their RD leads are clamped to mark, their SD leads are being ignored, and continuous scrambled marking is being modulated onto their respective carriers, which are on continuously. Assume now that terminal 10 raises its RTS lead. The signal indication by which, in accordance with the invention, data set 20 communicates this fact to data set 40 is illustratively at least a first scrambled space and, illustratively, as indicated at state 41, two scrambled spaces, inserted into the stream of scrambled marks that have been being transmitted by data set 20 to this point. Data set 20 thereupon raises its CTS lead at state 43 and then enters transmit state 45 in which the user data on lead SD is modulated onto the outgoing carrier and transmitted over the channel.

Meanwhile, data set 40 which, as previously mentioned, was also initially in idle state 30, reponds to the first space that it detects in the stream of marks theretofore transmitted by data set 20, by entering state 33, at which it raises its lead RLS and unclamps its lead RD. Data set 40 thereupon enters receive state 35, in which data reception occurs. (It may be noted at this point that if a transmission or other error causes a space to be erroneously inserted into the idle state marking stream of data set 20, data set 40 will be established erroneously in the receive state until data set 20 subsequently goes into, and then—as discussed below—out of, the transmit state. In typical half-duplex operation, however, the idle periods are quite short and the turnarounds quite frequent. Thus, the probability that this error condition will arise is relatively low and its likely duration relatively short. Accordingly, no provision is made in the present embodiment to explicitly deal with this situation, although various alternative ways of dealing with it could undoubtedly be arrived at and implemented, if desired.)

The signal indication by which, in accordance with the invention, data set 20 communicates to data set 40 the fact that terminal 10 has dropped its RTS lead is illustratively a predetermined bit pattern. The bit pattern is preferably one that terminal 10 is unlikely to transmit so as to minimize the probability that user data will cause an erroneous RTS-dropped indication at data set 40. It is also desirable to transmit the pattern in such a way that the signal indication will be perceived at data set 40 even in the presence of at least some types of transmission errors.

In the present illustrative embodiment, the bit pattern that indicates to data set 40 that the RTS lead of terminal 10 has been dropped —and that data set 40 should thus drop its RLS lead—is a string of 65 unscrambled marks. This pattern was chosen for a number of reasons. Firstly, the likelihood that any particular 65-bit pattern will be transmitted is, in and of itself, quite small. Moreover, continuous marking is implementationally more convenient to generate than, say, some random pattern. One might think, on the other hand that a string of unscrambled marks is not a good choice as compared, for example, to some random sequence of bits because (a) certain users might be expected to generate long strings of marks in their data streams and (b) even though user's data is scrambled, the scrambler output in response to a continuous string of marks is itself a continuous stream of marks if the scrambler input marks are preceded by a particular 17 bits associated with the current scrambler state—an occurrence which may be deemed sufficiently probable to be a problem. The scrambler used in the present illustrative embodiment conforms to CCITT Recommendation V.22BIS, in accordance with which, if the scrambler has output 64 or more marks in a row, it inverts the following bit. (This inversion is reversed by the descrambler within the receiving data set.) Thus in order for the scrambled user data to contain a string of 65 marks in a row, the user's unscrambled data would have to comprise a particular 17-bit sequence followed by exactly 64 marks followed by a space—an occurrence which we judge to be acceptably unlikely. A further advantage to the use of a sequence of continuous unscrambled marking to signal the dropping of terminal 10's RTS lead is pointed out hereinbelow.

If the transmitted sequence of unscrambled marks were comprised of exactly 65 bits, even a single transmission and/or detection bit error would cause data set 40 to miss the fact that the transmission is over. In order to account for the worst case of such an error, i.e., where the error occurs right at the 65th bit, the stream of transmitted unscrambled marks in the present illustrative embodiment is twice 65, i.e., 130.

Returning, then, to FIGS. 2 and 3, the dropping by terminal 10 of its RTS lead causes data set 20 to immediately drop its CTS lead and ignore whatever is on lead SD, as indicated at state 47, and to transmit 130 unscrambled marks, as indicated at state 48. Data set 20 then returns to idle state 30.

Data set 40, for its part, upon detecting the stream of 65 unscrambled bits, immediately drops its RLS lead and re-clamps its RD lead, as indicated at state 36. FIG. 2 depicts the case where no bit errors occur in the transmission or detection of the unscrambled mark sequence so that state 36 is entered after the 65th unscrambled mark is received. During the time subsequent to the last user-supplied bit and prior to detection of the 65th unscrambled bit, data set 40 continues to supply to terminal 50 on its lead RD the data being received from channel 35 since the data set has no way of knowing that that data is not user-originated. The unscrambled marks are, however, passed through data set 40's descrambler prior to being passed to terminal 50—as, indeed, is all data passed thereto—and the output of the descrambler in response to a long stream of unscrambled marks is 17 bits of erroneous data followed by continuous marks. Advantageously, the short burst of erroneous data does not pose a problem. As previously noted, prior art data sets such as the 201C present about 5 ms of erroneous data before a loss of carrier is detected and the RLS lead is dropped, and users' terminal equipment is already adapted to "pad out," or ignore, such erroneous data. Moreover, the transmission protocols used by conventional data processing/communication arrangements are such that the continuous marking which follows the erroneous data will be understood to be nothing more than that and will not be interpreted as valid data. This is the further reason, alluded to above, that it is advantageous to use unscrambled marks to signal the dropping of the RTS lead.

Before data set 40 can return to the idle state and thus be in a position to respond to the raising of the RTS lead by terminal 50, it must wait for a sufficient time to ensure that the entire string of 130 unscrambled marks has been transmitted by data set 20 and that the channel is thus clear for transmission. Taking the worst case, there is some probability that the tail end of the user's data, after being scrambled, will include a string of 64 continuous marks. In this situation, data set 40 will be triggered into state 36 as soon as the first unscrambled mark transmitted by data set 20 is received. The duration of the above-mentioned waiting period must thus be 129-bit periods. Assuming that, like the 201C, the data sets of this embodiment operate at 2400 bits/sec, this is a period of about 54 ms. Thus, as shown in FIG. 3, data set 40 enters state 38 from state 36 to wait out this 54-ms period. It then returns to idle state 30. Data set 40 will not respond to the two-space pattern during this period. Data set 20 must thus be precluded from transmitting same. To this end, although not explicitly shown in the drawing, data set 20 is precluded from entering state 41, after having left state 48, until it has been in idle state 30 for at least 54 ms.

In addition, although not explicitly shown in the drawing, data set 40 is precluded from entering state 33 for 54 ms after having entered state 30 from state 38. This prevents data set 40 from responding to an erroneous space that might be generated by its descrambler as late as 64 bits (54 ms) after data set 20 has completed its transmission of unscrambled marks, that erroneous space being the result of the above-mentioned scrambler bit inversion. It also serves as a partial solution to the problem mentioned above relating to erroneous spaces in the idle-state marking stream.

The turnaround time of the present illustrative system, i.e., the time from when terminal 10 drops its RTS lead to the time that data set 40 raises its CTS lead (assuming that terminal 50 has raised its RTS lead as soon as its RLS lead has been dropped and assuming that, as will usually be the case, the 65th unscrambled mark out of the 130 actually transmitted is the one that is detected) is the sum of (a) the time required for data set 20 to transmit the first 65 unscrambled bits, (b) the 129-bit waiting time in data set 40 and (c) the time required for data set 40 to transmit the two-space start-up pattern. This yields a total of 196 bits which, at 2400 bits/sec, yields a turnaround time of about 82 ms—a substantial improvement over the 155 ms turnaround time of the 201C.

Figure 4:
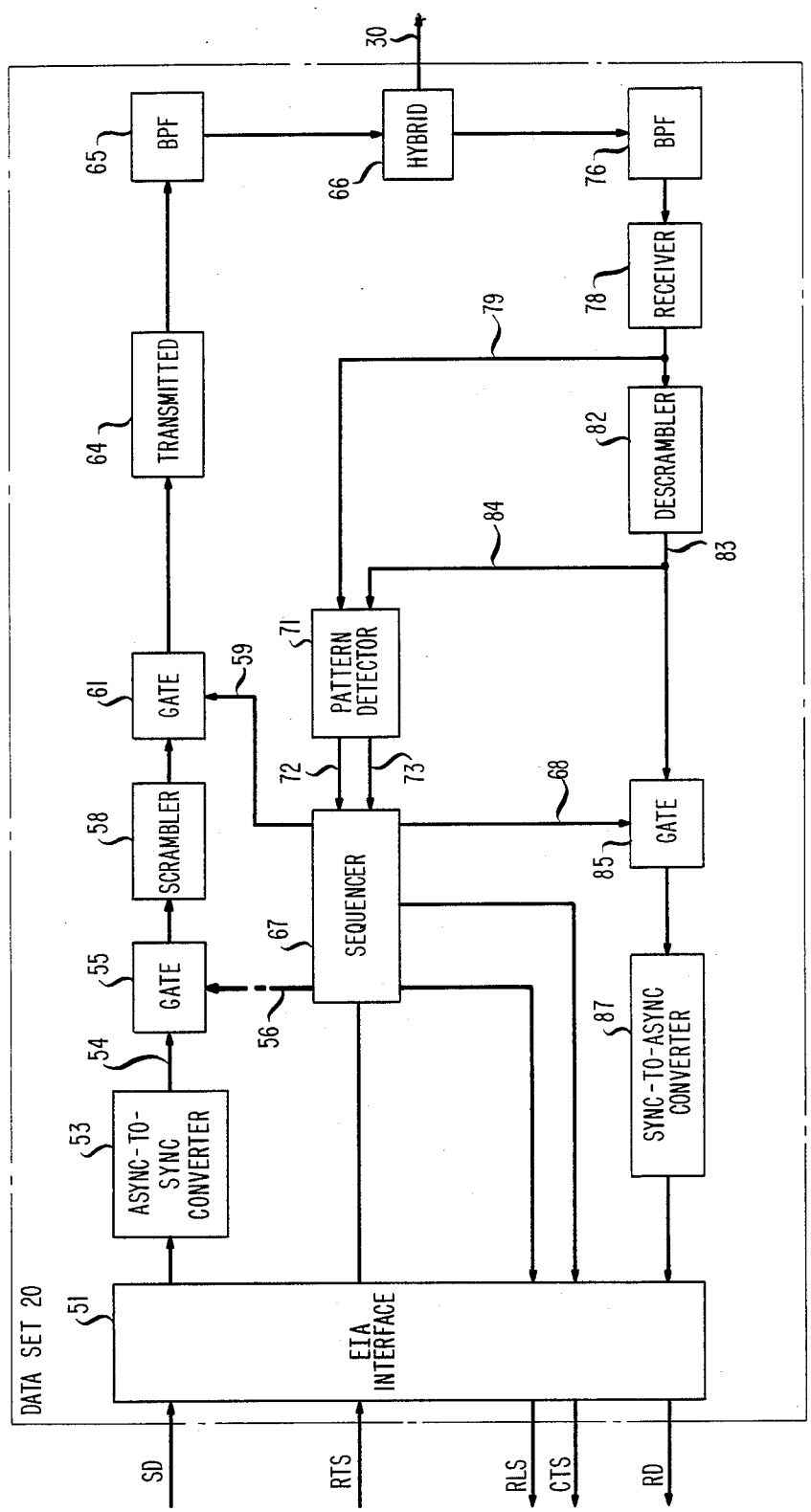
FIG. 4 is a block diagram of one of the data sets of FIG. 1.

The block diagram of FIG. 4 shows the functional components of data set 20 when it is configured to emulate half-duplex operation in accordance with the invention. Since data set 40 is substantially identical to data set 20, it need not be described in further detail.

In particular, data set 20 includes a standard RS-232-C interface connector 51 via which leads SD, RTS, RLS, CTS and RD are connected between the data set and terminal 10. As in FIG. 1, other standard leads of connector not germane to the present discussion are not explicitly shown.

The SD lead extends to asynchronous-to-synchronous converter circuit 53, which is operative when the bits from terminal 10 are provided asynchronously on lead SD to convert those bits to a synchronous format required by the data set. (Converter 53, as well as synchronous-asynchronous converter 87 discussed below, would be bypassed for applications in which the data is provided on lead SD synchronously.) During the transmission of user data, which is what will be assumed at this point, the synchronous bit stream put out by converter 53 passes via lead 54 and gate 55 to scrambler 58. The scrambled bit stream passes through gate 61 to transmitter 64, which performs such standard functions as differential encoding and modulation. The modulated carrier signal at the output of transmitter 64 is applied to transmit bandpass filter 65 and the resulting filtered signal is applied, via hybrid 66, the outgoing channel, which comprises a predetermined half of the bandwidth of channel 35.

Modulated carrier signals received from data set 40 over the incoming channel, which comprises the other half of the bandwidth of channel 35, are applied by hybrid 66 to receive bandpass filter 76 and thence to receiver 78. The latter performs such standard functions as a/d conversion, equalization, demodulation, differential decoding and carrier and timing recovery. The bit stream at the output of receiver 78 is descrambled by descrambler 82 and, during the reception of user data, which is what will be assumed at this point, the descrambled bit stream passes via lead 83 and gate 85 to synchronous-to-asynchronous converter 87. The latter, which performs the inverse function to asynchronous-to-synchronous converter 53, provides an asynchronous version of the received user data to terminal 10 on lead RD.

It will be appreciated, of course, that the above-described functional blocks of data set 20 are all well-known prior art data set components and thus these components need not be described in further detail.

Data set 20 further includes a sequencer 67 which controls data set operation to implement the present invention. The function of sequencer 67 as it relates to the invention is, in essence, to implement the state diagram of FIG. 3. Sequencer 67 can be realized, for example, as a microprocessor programmed in conventional fashion to implement that state diagram or, alternatively, as a sequential state machine comprised of simple counters, timers and boolean logic gates. Sequencer 67 may also perform other desired data set functions.

When data set 20 is in its idle state, sequencer 67 holds the CTS and RLS leads off. Also, it controls gate 55 via a two-bit signal on cable 56 to ignore any data on lead 54 (which would have originated from lead SD) and to provide to scrambler 58 a signal level representative of marking. Sequencer 67 also controls gate 85 to ignore any data appearing on lead 83 and to supply the aforementioned signal level to converter 87, thereby clamping RD to mark. In addition, sequencer 67 controls gate 61 to allow the output of scrambler 58 to pass through to transmitter 64 so that, as desired, scrambled marks are modulated onto the outgoing carrier.

Among the leads extending to sequencer 67 is the RTS lead of interface 51. When that lead is raised by terminal 10, sequencer 67 changes the two-bit signal on cable 56 to indicate to gate 55 that a signal level representative of spacing should be applied to scrambler 58. After a time equal to two bit periods, during which the above-discussed two-space pattern is modulated onto the carrier, sequencer 67 raises the CTS lead and, concurrently, changes the signal on cable 56 to indicate to gate 55 that scrambler 55 is now to receive the data on lead 54. The user data from lead SD is thus now modulated onto the outgoing carrier.

When the RTS lead is subsequently dropped by terminal 10, sequencer 67 drops the CTS lead and, concurrently, changes the signal on lead 59 to indicate to gate 61 that the signal level corresponding to marking, rather than the output of scrambler 58, is to be applied to transmitter 64. This, of course, causes transmitter 64 to modulate unscrambled marks onto the outgoing carrier. Once the desired 130 unscrambled marks have been transmitted, sequencer 67 changes the signal on lead 59 to its previous value. The signal on cable 56 has, in the meantime, also been changed by sequencer 67 back to its original value. After timing the 54 ms interval of state 49, sequencer makes itself again responsive to lead RTS (or, as discussed below, to lead 73) in idle state 30.

Data set 20 further includes a pattern detector 71, which monitors the output of receiver 78 via lead 79 and the output of descrambler 82 via lead 84. Whenever pattern detector 71 detects a space in the bit stream at the output of descrambler 82, it extends a signal to sequencer 67 via lead 73. Assuming that the data set is in its idle state at this time, sequencer 67 responds to this signal by raising the RLS lead and changes the signal on lead 68 so as to indicate to gate 85 that the signal to be extended to synchronous-to-asynchronous converter 87 is the output signal of descrambler 82. The received user data is thus provided to terminal 10 on lead RD.

When pattern detector 71 subsequently detects a string of 65 consecutive unscrambled marks at the output of receiver 78, it extends a signal to sequencer 67 via lead 72. The sequencer responds by dropping the RLS lead and returning the signal on lead 68 to its previous value, thereby re-clamping lead RD to mark. After timing a 54 ms interval (corresponding to state 38 in FIG. 3), sequencer again returns to idle state 30.

The foregoing merely illustrates the principles of the invention. For example, although the invention is shown and described herein in the context of a data set comprised of discrete functional elements, it can be equally as well implemented in a data set in which the various signal processing and supervisory functions are performed by one or more programmed processors.

Moreover, the particular signal indications used to signal the raising and dropping of the RTS lead in accordance with the invention, may be different from those described herein. Such things as the type and duration of the signal indications, the criteria used for detecting them, including the various associated waiting periods, etc., may all be selected as suits the application at hand. Various possibilities for, for example, the signal indications include tones, out-of-band signals, the appearance and disappearance of a unique predetermined idle-state signal sequence which the user is not likely to transmit, or momentary breaks in the carrier. (In the latter case, the momentary breaks would be sufficiently short that carrier phase and sample timing in the receiving data set would not be lost and the carrier would still be "continuous" as that term is used herein.) Such various alternative approaches may be taken, for example, with a view toward providing an even shorter turnaround time than the present illustrative embodiment provides or perhaps to satisfy some other design goals, concerns or constraints.

An example of the latter occurred when the invention was added to the design of a full-duplex data set whose overall design effort was already well underway. This circumstance imposed a number of constraints which precluded an implementation of the invention that was as efficient as that just described. In particular, it was not convenient to provide a mechanism for simply inserting two spaces into the idle state marking stream. Several cycles of the so-called double-dotting pattern, which has spaces within it, were used instead. This necessitated the imposition of waiting periods prior to the raising of the CTS and RLS leads in the transmitting and receiving data sets, respectively. In addition, it was not convenient to deal with the received data on a bit-by-bit basis. Complete symbols, each representing 4 bits, had to be worked with. This, in turn, dictated that the pattern of transmitted unscrambled marks be longer than the 130-bit pattern used in the embodiment disclosed herein. In addition, certain built-in signal processing delays internal to the data set design had to be accounted for.

Considerations such as the foregoing resulted in a design whose overall turnaround time approached, rather than being significantly less than, that of the 201C. It was nonetheless found to be advantageous to implement the invention in this data set design because, for example, it resulted in a product which had the flexibility to be operated in either full- or half-duplex mode as the user's application required. In addition, state-of-the art design and manufacturing capability allowed the data set to be priced significantly lower than the 201C, thereby providing an attractively-priced data set for the half-duplex market without having to design, manufacture and market a completely different data set model.

In view of the foregoing, it will be appreciated that those skilled in the art will be able to devise numerous alternative arrangements which, although not explicitly shown or described herein, embody the principles of the invention.

What is claimed is:

1. A full-duplex data set adapted for use in conjunction with an associated first half-duplex data terminal, said data set being adapted to communicate to a second data set over an outgoing communication channel and to receive communications from said second full-duplex data set from an incoming communication channel, said second data set being adapted for use in conjunction with an associated second half-duplex data terminal, each of said terminals having a request-to-send lead which is activated by said each terminal when data is desired to be passed from said each terminal to the associated data set, and at least said first terminal further having a receive line signal lead and being adapted to activate its request-to-send lead only if its receive line signal lead is deactivated, said data set comprising means for receiving near-end data from said first terminal, means for modulating said near-end data signal onto a first continuous carrier signal and for applying the resulting modulated signal to said outgoing channel, means for receiving from said incoming channel a second continuous carrier signal modulated with far-end data and for recovering said far-end data from said second carrier signal, means for activating said receive line signal lead in response to a first predetermined signal indication in said received carrier signal and for deactivating said receive line signal lead in response to a second predetermined signal indication in said received carrier signal, said first signal indication being generated by said second data set in response to activation by said second terminal of its request-to-send lead and said second signal indication being generated by said second data set in response to deactivation by said second terminal of its request-to-send lead, and means for applying to said first terminal the recovered far-end data that is intermediate said first and second signal indications.

2. A continuous carrier data set adapted for use in conjunction with an associated half-duplex data terminal, said terminal having a request-to-send lead and a send data lead, said request-to-send lead being activated by said terminal when data is desired to be passed from said terminal to said data set on said send data lead and said data set having a clear-to-send lead adapted to be connected to said terminal and which said data set activates when it is ready to receive said data, said data set comprising means for generating a continuous carrier signal modulated in accordance with a modulating signal and for applying the resulting modulated carrier signal to a transmission channel, and circuit means for generating sequentially as said modulating signal (a) a first predetermined signal indication generated in response to, and indicative of the activation of, said request-to-send lead, said circuit means being adapted to activate said clear-to-send lead at the end of said first predetermined signal, (b) the data appearing on said send data lead subsequent to the activation of said clear-to-send lead and prior to a deactivation of said request-to-send lead, said circuit means being further adapted to deactivate said clear-to-send signal in response to said deactivation of said request-to-send lead, and (c) a second predetermined signal indication indicative of said deactivation of said request-to-send lead.

* * * * *